United States Patent
Hagiuda

(10) Patent No.: US 8,854,656 B2
(45) Date of Patent: Oct. 7, 2014

(54) MANAGEMENT APPARATUS, SYSTEM, AND MANAGEMENT METHOD

(75) Inventor: Tadashi Hagiuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 737 days.

(21) Appl. No.: 13/007,337

(22) Filed: Jan. 14, 2011

(65) Prior Publication Data

US 2011/0176171 A1 Jul. 21, 2011

(30) Foreign Application Priority Data

Jan. 21, 2010 (JP) ................................. 2010-011395

(51) Int. Cl.
- *G06F 3/12* (2006.01)
- *G06F 1/32* (2006.01)
- *H04N 1/00* (2006.01)
- *G03G 15/00* (2006.01)
- *G06F 1/26* (2006.01)

(52) U.S. Cl.
CPC .......... *G06F 1/3203* (2013.01); *H04N 1/00891* (2013.01); *H04N 2201/0039* (2013.01); *H04N 2201/0074* (2013.01); *G03G 15/5004* (2013.01); *H04N 1/00222* (2013.01); *G06F 1/266* (2013.01); *H04N 1/00344* (2013.01); *H04N 2201/0094* (2013.01); *H04N 1/00244* (2013.01); *G03G 15/5075* (2013.01)
USPC .......... 358/1.15; 358/1.14; 358/1.9; 713/300; 709/219; 709/201

(58) Field of Classification Search
None
See application file for complete search history.

(56) References Cited

U.S. PATENT DOCUMENTS

| 6,956,934 | B2 * | 10/2005 | Watanabe | 379/100.03 |
|---|---|---|---|---|
| 7,636,771 | B2 * | 12/2009 | Torii | 709/219 |
| 8,074,098 | B2 * | 12/2011 | Fukuyama et al. | 714/4.11 |
| 8,527,786 | B2 * | 9/2013 | Nakano | 713/300 |
| 8,547,564 | B2 * | 10/2013 | Ito | 358/1.14 |
| 8,547,567 | B2 * | 10/2013 | Manabe | 358/1.14 |
| 8,576,431 | B2 * | 11/2013 | Kato | 358/1.15 |
| 2003/0085621 | A1 * | 5/2003 | Potega | 307/18 |
| 2006/0111144 | A1 * | 5/2006 | Nakajima | 455/556.1 |
| 2013/0182277 | A1 * | 7/2013 | Iguchi | 358/1.14 |

FOREIGN PATENT DOCUMENTS

| JP | 2002-163090 A | 6/2002 |
|---|---|---|
| JP | 2008-003863 A | 1/2008 |

* cited by examiner

*Primary Examiner* — Ashish K Thomas
(74) *Attorney, Agent, or Firm* — Canon U.S.A., Inc. IP Division

(57) ABSTRACT

A management apparatus transmits a reservation request for specifying time for turning off power supply of an image processing apparatus in response to determination that current time is in a time period for turning off the power supply of image processing apparatus if a start-up request is received from the image processing apparatus, transmits a start-up response for permitting start-up of functions other than a communication function provided in the image processing apparatus when a reservation response, to the reservation request from the image processing apparatus, including specified time for turning off the power supply of the image processing apparatus is received, and transmits a command for turning off the power supply of the image processing apparatus at the time specified by the reservation response, to the image processing apparatus.

7 Claims, 16 Drawing Sheets

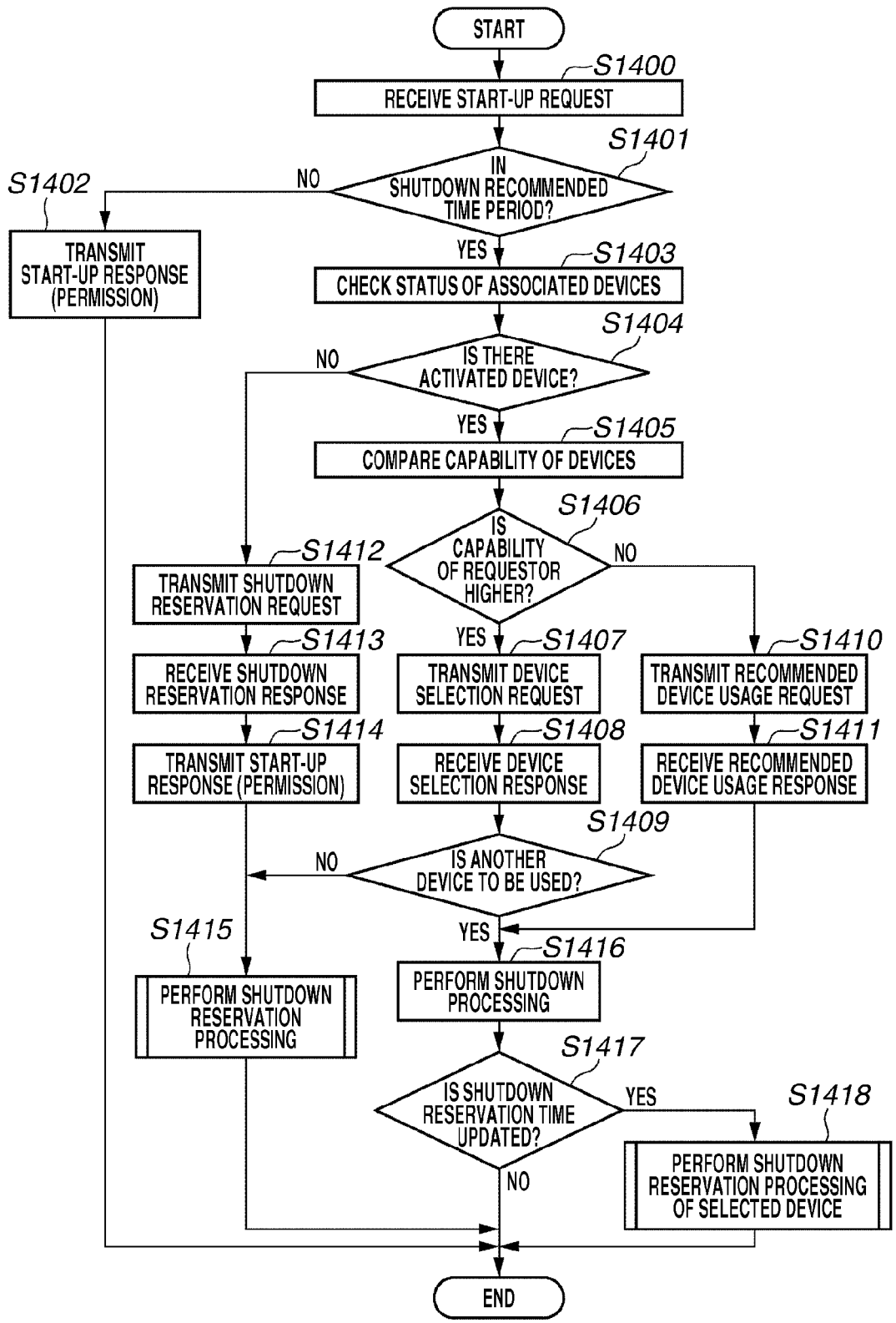

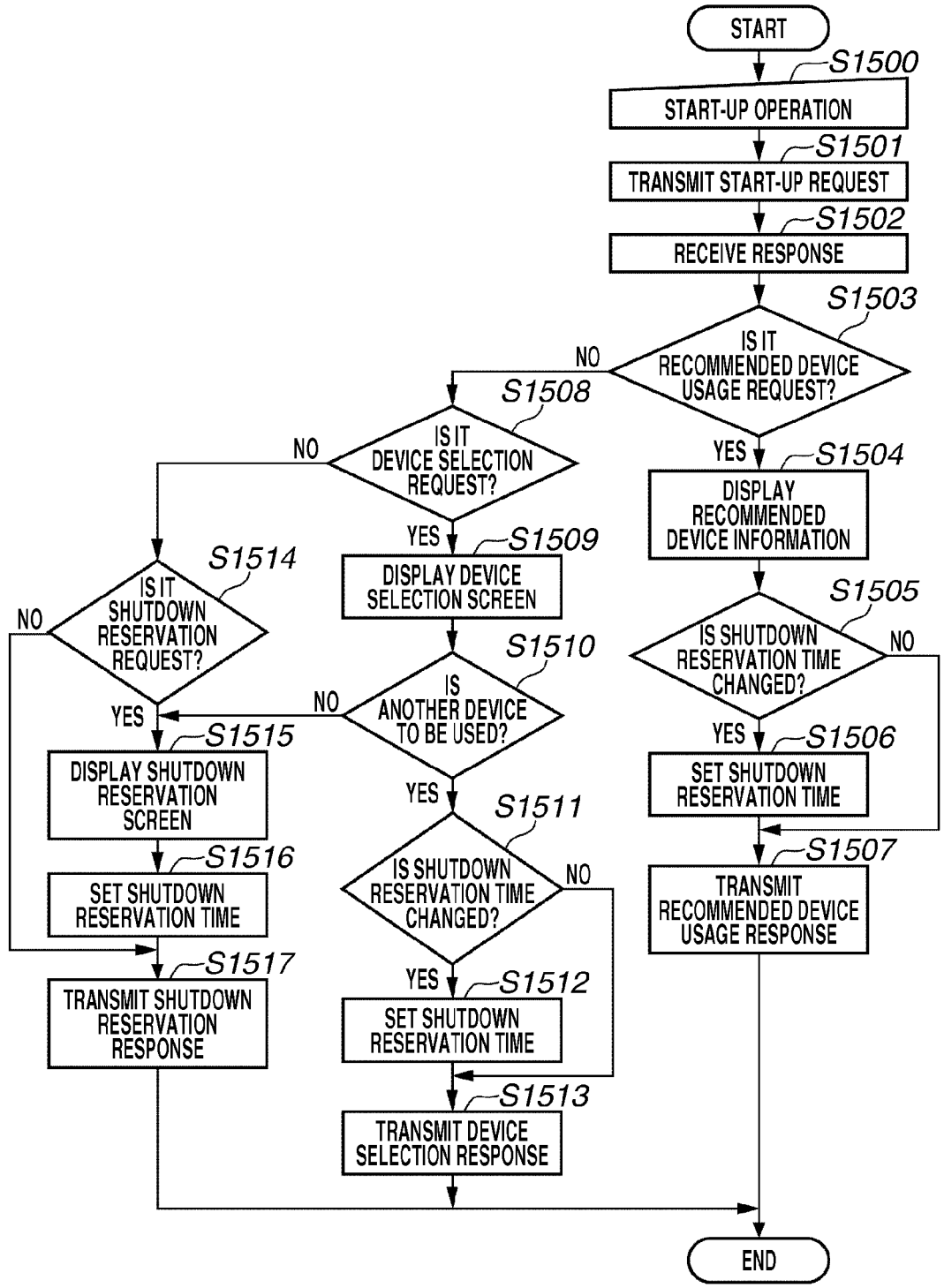

FOLLOWING DEVICE IS ACTIVATED IN THE NETWORK.  ---*1601a*
DEVICE NAME:              MFP2
SETUP LOCATION:           OFFICE ROOM 2
IP ADDRESS:               172.24.123.12
SHUTDOWN RESERVATION TIME: 21:30             *1602a*

☑ CHANGE SHUTDOWN RESERVATION
    TIME OF DEVICE OF MFP2        [    ] : [    ]

USE THE ABOVE DEVICE.

*1603a*---  [ YES ]   [ NO ]

*1600b*

FOLLOWING DEVICE IS ACTIVATED IN THE NETWORK.  ---*1601b*
DEVICE NAME:              MFP2
SETUP LOCATION:           OFFICE ROOM 2
IP ADDRESS:               172.24.123.12
SHUTDOWN RESERVATION TIME: 21:30             *1602b*

☑ CHANGE SHUTDOWN RESERVATION
    TIME OF DEVICE OF MFP2        [    ] : [    ]

DO YOU USE THE ABOVE DEVICE?

*1603b*---  [ YES ]   [ NO ]

MANAGEMENT APPARATUS, SYSTEM, AND MANAGEMENT METHOD

BACKGROUND OF THE INVENTION

1. Field of the Invention

The present invention relates to a technique for managing network devices.

2. Description of the Related Art

In recent years, due to the deteriorating global environment and economic conditions, requirements for reducing power consumption of electric products have been increasingly made by various laws and standards. With the above-described back ground, also, for multifunctional devices installed in large-scale offices, in order to reduce unnecessary standby electricity, demands for developing a function to control power supply from a remote location has been increasing.

To meet such needs, for example, Japanese Patent Application Laid-Open No. 2008-3863 discusses a system for transmitting a command from a management server at specified time, and turning off power supply of multifunctional devices under management. Further, for example, Japanese Patent Application Laid-Open No. 2002-163090 discusses a system for managing the number of activated multifunctional devices and not permitting turning on power supply of multifunctional devices of the number exceeding a predetermined upper limit.

In the above-described known techniques, when a user manually starts a multifunctional device that has been switched off by a command from a management server, until the device receives a command from the management server again, the device may be left turned on. Moreover, when multifunctional devices that can be started are managed in terms of the number of the devices, even in the time range in which the devices are expected not to be used so often, the number of the multifunctional devices that can be started does not change. Accordingly, effective power supply management is not always performed.

SUMMARY OF THE INVENTION

According to an aspect of the present invention, a management apparatus configured to manage status of power supply of a plurality of image processing apparatuses capable of communicating via a network, includes a setting unit configured to set a time period for turning off the power supply of the image processing apparatuses, a determination unit configured to determine whether current time is in the time period set by the setting unit if a start-up request is received from the image processing apparatus, a request unit configured to transmit a reservation request for specifying time for turning off the power supply of the image processing apparatus that has transmitted the start-up request to the transmitted image processing apparatus if the determination unit determines that the current time is in the time period set by the setting unit, a start-up permission unit configured to transmit a start-up response for permitting start-up of functions other than a communication function provided in the transmitted image processing apparatus when a reservation response, to the reservation request from the transmitted image processing apparatus, including specified time for turning off the power supply of the transmitted image processing apparatus is received to the transmitted image processing apparatus, and a management unit configured to transmit a command for turning off the power supply of the transmitted image processing apparatus at the time specified by the reservation response, to the transmitted image processing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute apart of the specification, illustrate exemplary embodiments, features, and aspects of the invention and, together with the description, serve to explain the principles of the invention.

FIG. 14 is a flowchart illustrating power-off processing in the power supply management server.

FIG. 15 is a flowchart illustrating power-off processing in the multifunctional device.

FIG. 16 illustrates an example of screens on the multifunctional device.

DESCRIPTION OF THE EMBODIMENTS

Various exemplary embodiments, features, and aspects of the invention will be described in detail below with reference to the drawings.

Figure 1:
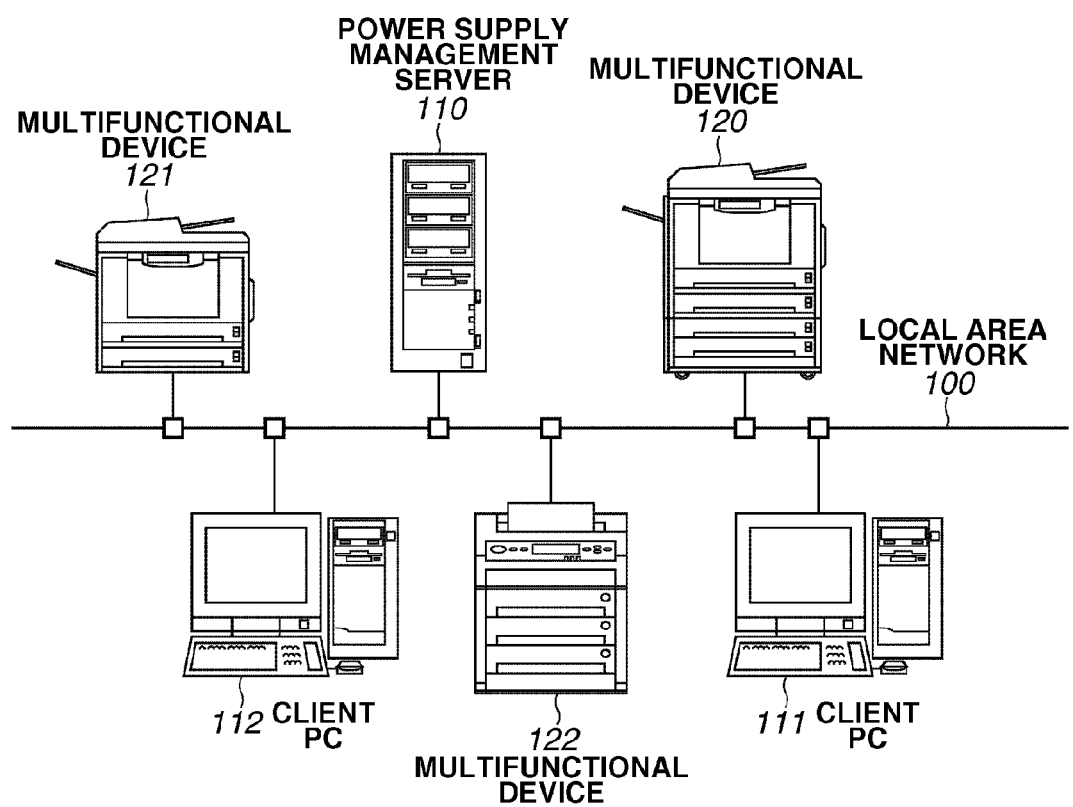
FIG. 1 illustrates a configuration of a power supply management system.

FIG. 1 illustrates a configuration of a power supply management system according to an exemplary embodiment of the present invention. A power supply management system includes a power supply management server 110, client personal computers (PCs) 111 and 112, and multifunctional devices 120, 121, and 122. Each of the power supply management server 110, the client PCs 111 and 112, and the multifunctional devices 120, 121, and 122 is connected to a local area network (LAN) 100, and can communicate with each other.

The power supply management server 110 is an example of a management apparatus. On the power supply management server 110, a network device management program is running. The power supply management server 110 manages power supply of the multifunctional devices 120, 121, and 122 according to a procedure described below. The multifunctional devices 120, 121, and 122 are an example of an image processing apparatus. The multifunctional devices have functions of a copying machine, a scanner, a printer, a facsimile, and the like.

On the multifunctional devices 120, 121, and 122, software for receiving a shutdown request from the power supply management server 110 and turning off each of their own power supply (a power-off state), is running. The network device management program running on the power supply management server 110 according to the present exemplary embodiment is WEB application that operates on a WWW server. The program is intended to be operated via a browser program in the client PCs 111 and 112.

Figure 2:
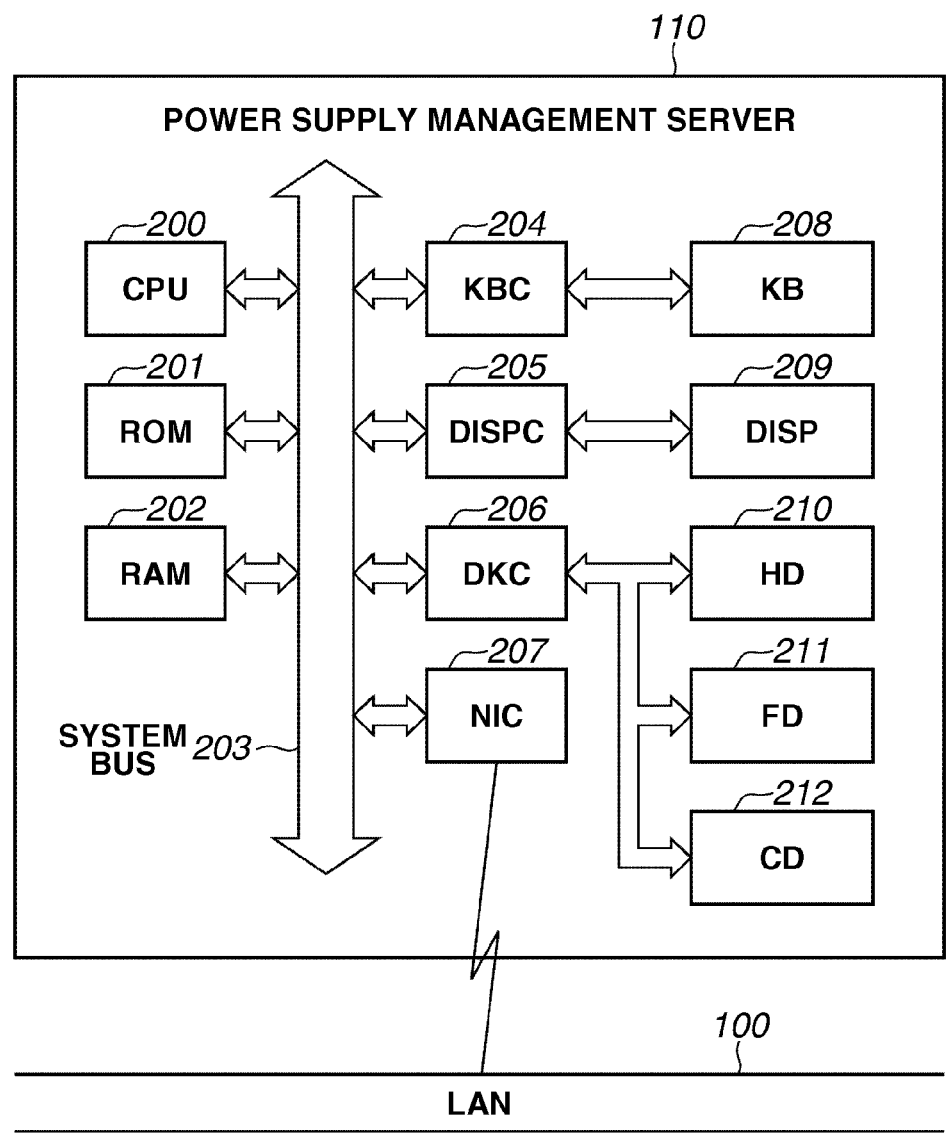
FIG. 2 is a block diagram illustrating a hardware configuration of a power supply management server.

FIG. 2 is a block diagram illustrating a hardware configuration of the power supply management server 110. The power supply management server 110 has a hardware configuration similar to that in general computers. Also, the client PCs 111 and 112 have a similar hardware configuration.

The power supply management server 110 includes a central processing unit (CPU) 200, read-only memory (ROM) 201, a random access memory (RAM) 202, a system bus 203, a keyboard controller (KBC) 204, a display controller (DISPC) 205, and a disk controller (DKC) 206. The power supply management server 110 also includes a network interface card (NIC) 207, a keyboard (KB) 208, and a display (DISP) 209.

The power supply management server 110 also includes a hard disk (HD) 210, a flexible disk controller (FD) 211, and a compact disk read-only memory (CD-ROM) drive (CD) 212.

The CPU 200 executes the network device management program (described below in detail) stored in the ROM 201 or the HD 210. Further, the CPU 200 performs overall control of each device connected to the system bus 203.

The RAM 202 serves as a main memory, a work area, or the like for the CPU 200. The KBC 204 controls an instruction input from the KB 208, a pointing device (not illustrated), or the like. The DISPC 205 controls display on the DISP 209.

The DKC 206 controls access to the HD 210, the FD 211, and the CD 212. The NIC 207 bi-directionally transmits and/or receives data to/from the client PCs 111 and 112, the multifunctional devices 120, 121, and 122 or the like via the LAN 100 that is an example of the network.

As long as not mentioned in the following descriptions, in the power supply management server 110, a main entity of execution on the hardware is the CPU 200, and a main entity of control on the software is the network device management program stored in the ROM 201 or the HD 210.

The network device management program can be stored in a storage medium such as a CD-ROM, and can be provided in that state. In such a case, the program is read from the storage medium such as the CD 212, or the like, and installed on the HD 210.

Figure 3:
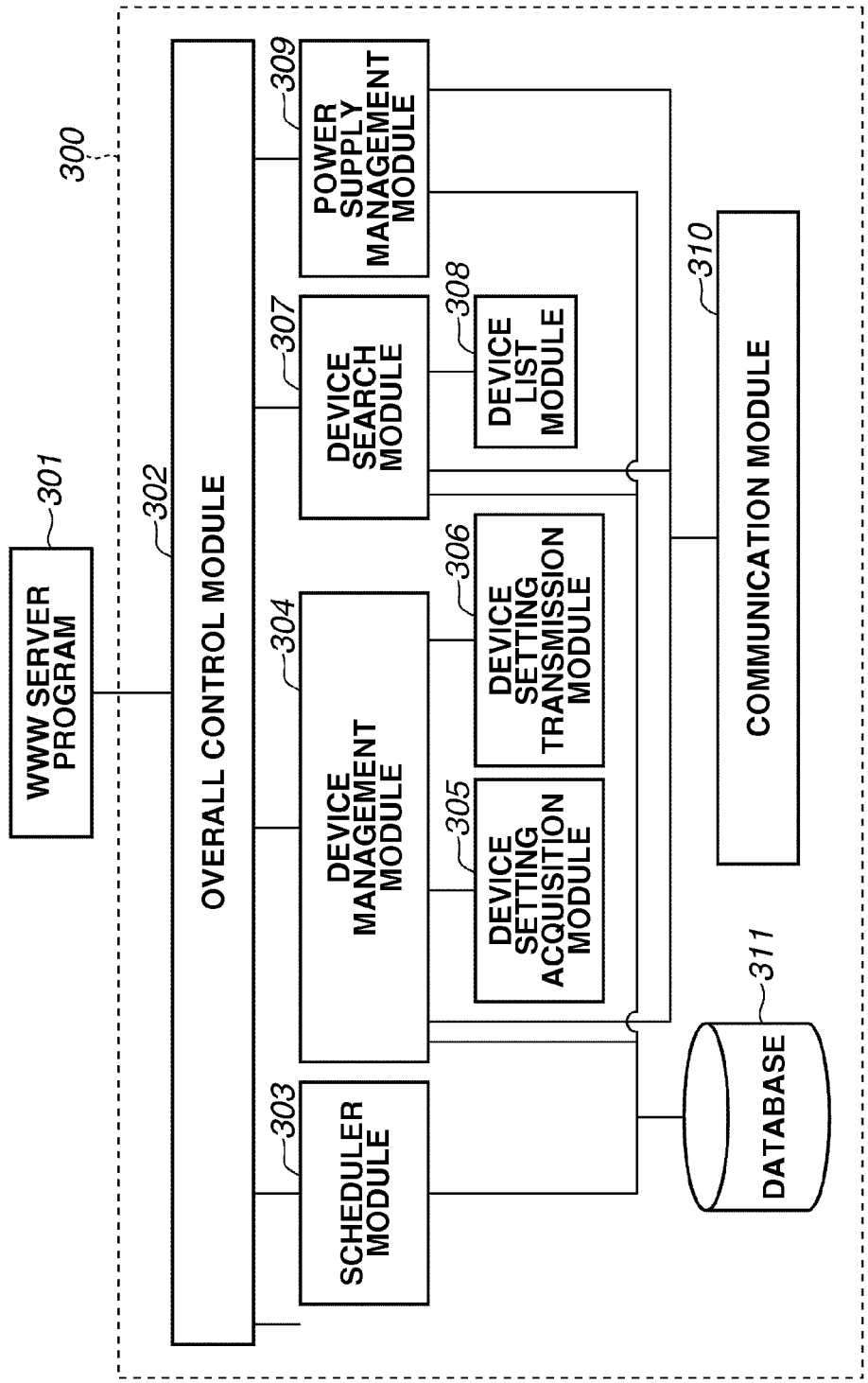
FIG. 3 is a block diagram illustrating a module configuration of a network device management program.

FIG. 3 is a block diagram illustrating a module configuration of a network device management program 300 running on the power supply management server 110. Functions and processing according to a flowchart described below in the power supply management server 110 are implemented by the CPU 200 by executing the processing according to a procedure of the network device management program 300 stored in the ROM 201 or the HD 210.

In the description, the network device management program 300 operates on a WWW server program 301, and performs communication using a WWW browser program (not illustrated) on the client PCs 111 and 112 and an HTTP protocol.

In the description, the network device management program 300 and the multifunctional devices 120, 121, and 122 communicate with each other using a SIMPLE Management Network Protocol (SNMP) or another unique protocol.

In FIG. 3, a general control module 302 analyzes a command received from the WWW server program 301. The general control module 302 assigns control to a scheduler module 303, a device management module 304, a device search module 307, and a power supply management module 309 according to the results of the analysis.

Further, the general control module 302 transmits HTML data generated in the scheduler module 303, the device management module 304, the device search module 307, and the power supply management module 309 to the WWW server program 301.

The scheduler module 303 controls timing for executing various types of processing executable in the network device management program 300. That is, execution timing of the various types of processing by the device management module 304, the device search module 307, and the power supply management module 309 is managed by the scheduler module 303.

The device management module 304 performs setting of information to multifunctional devices to be managed, and acquisition of information from the multifunctional devices. Further, the device management module 304 performs control of display or the like of an associated user interface (UI). The device management module 304 further controls a device setting acquisition module 305 for acquiring information from a multifunctional device and a device setting transmission module 306 for transmitting information to a multifunctional device.

The device search module 307 performs search of the multifunctional devices connected to the LAN 100, control of various parameters associated with the search processing, display of the associated UI, and the like. A device list module 308, according to the control of the device search module 307, performs processing such as list display of information, information update, import, export, and the like of the searched multifunctional device.

A power supply management module 309, in response to the control by the scheduler module 303, performs control so that a command for requesting shutdown at predetermined time is transmitted and the multifunctional device is shut down. Further, the power supply management module 309, when the multifunctional device is started in the time period set according to a procedure described below, checks existence or nonexistence of associated multifunctional devices and comparison of capability of the devices in order to efficiently manage power supply of the multifunctional devices.

A communication module 310 performs communication with the multifunctional devices in response to an instruction from the device management module 304, the device search module 307, and the power supply management module 309, and transmits and receives various pieces of information.

A database 311 stores various pieces of information acquired in the device management module 304 and the device search module 307, and various pieces of information set by user operation.

Figure 4:
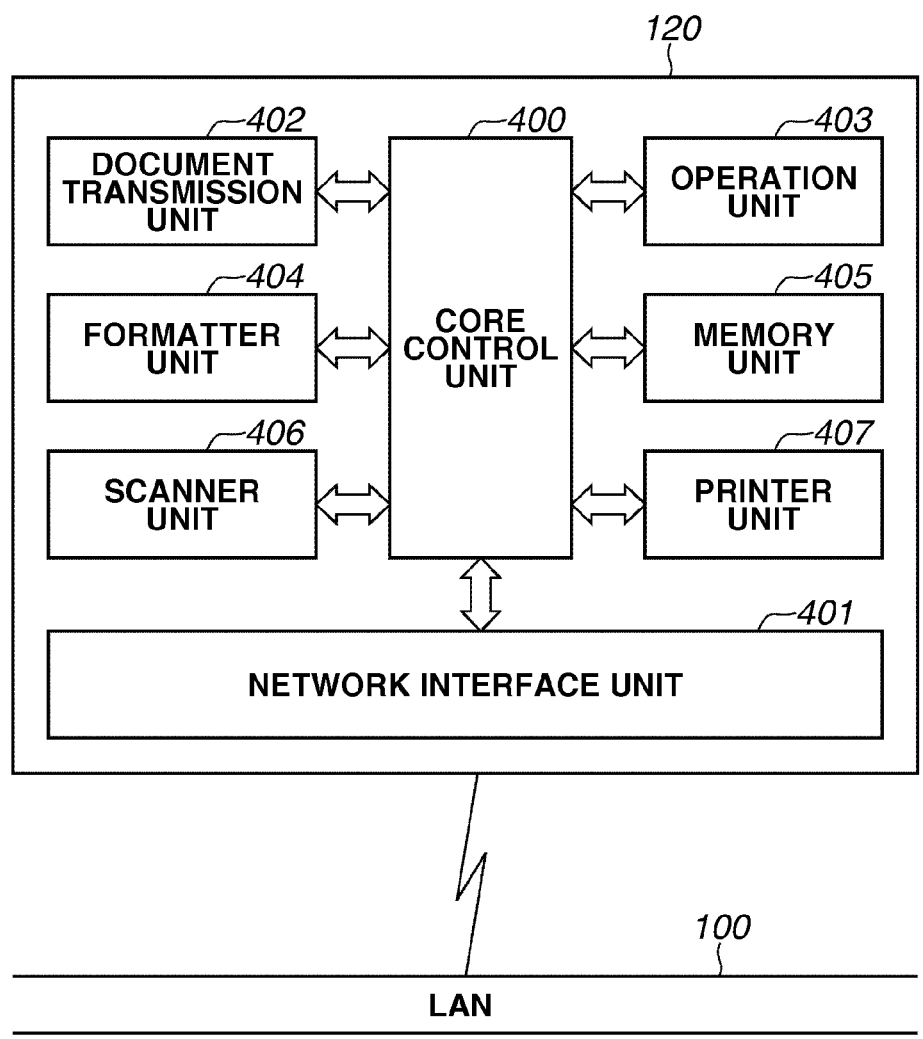
FIG. 4 is a block diagram illustrating a hardware configuration of a multifunctional device.

FIG. 4 is a block diagram illustrating an example of a hardware configuration of the multifunctional device 120. The multifunctional devices 121 and 122 have configurations similar to that of the multifunctional device 120.

The multifunctional device 120 includes a core control unit 400, a network interface unit 401, a document transmission unit 402, an operation unit 403, a formatter unit 404, a memory unit 405, a scanner unit 406, and a printer unit 407.

The core control unit 400 is connected to each of the network interface unit 401, the document transmission unit 402, the operation unit 403, the formatter unit 404, the memory unit 405, the scanner unit 406, and the printer unit 407, and performs overall control of the devices. The core control unit 400 can install an application program that runs in the apparatus by a procedure described below.

The network interface unit 401 controls communication with the various network devices connected to the LAN 100, receives job control data from the computers (client PCs 111, 112, and the like), and transmits and receives document data. The job control data includes a job control instruction to be transmitted together with page description language (PDL) data. For example, the job control instruction is to rasterize PDL data to print as image data, perform staple sort, and discharge paper.

Further, via the network interface unit 401, a request of shutdown by the power supply management server 110 and an inquiry of information by the other management programs are processed.

The document transmission unit 402 is connected to the LAN 100 via the core control unit 400 and the network interface unit 401. The document transmission unit 402 uses various communication protocols and transmits information input from the scanner unit 406 and information stored in the memory unit 405 to each device.

The operation unit 403 performs an instruction to output a document to the document transmission unit 402 and an instruction to input a document via the scanner unit 406. Setting to the various application programs installed in the apparatus can be made via the operation unit 403.

The formatter unit 404 is connected to the core control unit 400, and rasterizes PDL data received from a computer via the network interface unit 401 into image data that can be output by the printer unit 407.

The memory unit 405 includes a storage unit such as a ROM, a RAM, or a hard disk. The memory unit 405 stores image data input from the scanner unit 406 or application, the other programs, and the like downloaded via the network.

The scanner unit 406 converts contents of a read paper document into image data, and transmits the data to another computer on the network via the network interface unit 401. Further, the scanner unit 406 stores the data into the memory unit 405 and outputs the data to the printer unit 407.

The printer unit 407 outputs image data inputted from the scanner unit 406 in response to an instruction by the operation unit 403, or image data received from the computer or the other multifunctional devices via the network interface unit 401.

Figure 5:
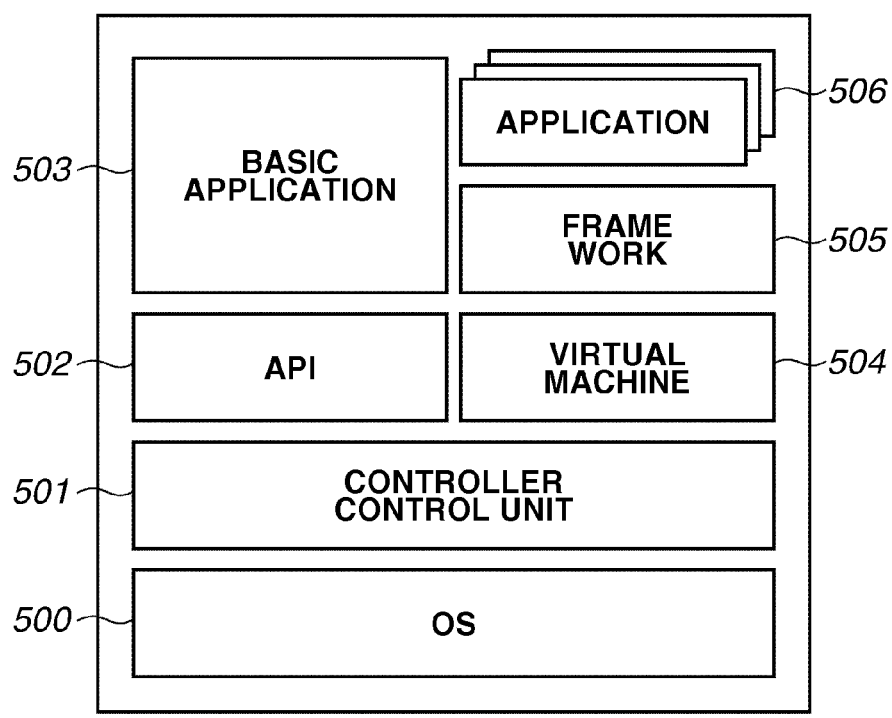
FIG. 5 is a block diagram illustrating a software configuration of the multifunctional device.

FIG. 5 illustrates software stored in the memory unit 405 in the multifunctional device 120 and to be executed in the core control unit 400. The multifunctional devices 121 and 122 have software configurations similar to that of the multifunctional device 120. Functions and processing according to a flowchart described below in the multifunctional device 120 are implemented by the core control unit 400 by executing processing according to a procedure of the application program stored in the memory unit 405.

A real time OS 500 is a first execution environment of a program that can control various functions of the multifunctional device 120 in real time. The real time OS 500 includes a library group that can control each function including an optional device or a function expansion card of the multifunctional device 120, and a module group that provides interface commands to a basic application 503 that operates in an upper layer.

A controller control unit 501 includes a module that operates on the real time OS 500 to control the document transmission unit 402, the operation unit 403, the formatter unit 404, the scanner unit 406, the printer unit 407, and the like.

An application programming interface (API) 502 is a module that performs processing to access the controller control unit 501 according to an instruction from the basic application 503.

The basic application 503 is a module that requests various types of processing to the controller control unit 501 using the API 502. The basic application 503 also can communicate with the power supply management server 110, the client PCs 111 and 112, and the other multifunctional devices 121 and 122 on the LAN 100 via the network interface unit 401. A virtual machine 504 is a second execution environment suitable for executing specific application. The virtual machine 504 is, for example, implemented by Java (registered trademark).

A framework 505 performs overall control of the application on the virtual machine 504 that is the second execution environment of the multifunctional device 120. Application 506 operates on the virtual machine 504 that is the second execution environment.

The application 506 provides the functions according to the present exemplary embodiment such as transmitting and receiving commands according to the control of the power supply management server 110, displaying a screen and performing shutdown according to the operation unit 403. As long as not mentioned in the present exemplary embodiment, in the multifunctional device 120, a main entity of execution on the hardware is the core control unit 400, and a main entity of control on the software is the application 506 that is executed by the core control unit 400.

Figure 6:
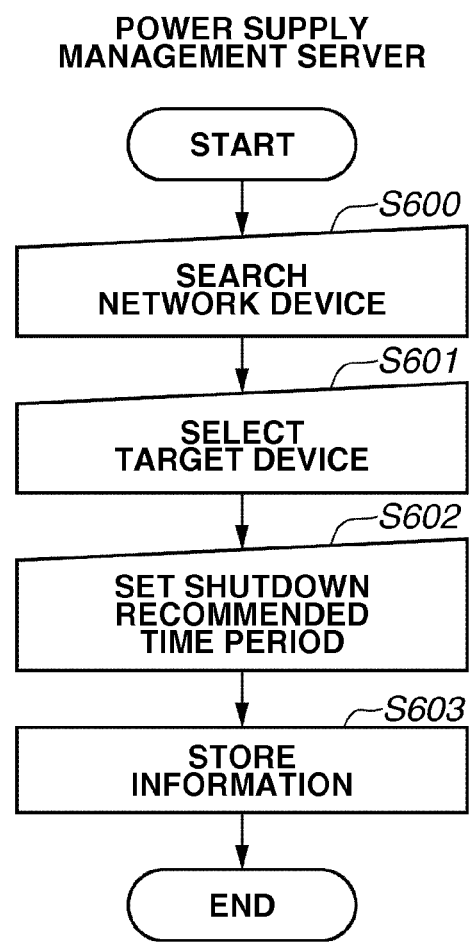
FIG. 6 is a flowchart illustrating data setting in the power supply management server.

FIG. 6 is a flowchart illustrating operation of acquiring various types of setting for performing power supply management by the network device management program 300 running on the power supply management server 110 and necessary information from the multifunctional device 120 under management.

In step S600, the device search module 307 performs search processing of the multifunctional devices 120, 121, and 122 connected to the LAN 100 on a condition set by a user in advance. In the device search processing according to the present exemplary embodiment, the search processing is performed by a broadcast packet of SNMP or a multicast packet of Service Location Protocol (SLP), however, it is not limited to the above.

In step S601, the power supply management module 309 selects a device (in this example, the multifunctional device 120) to be the target of the power supply management from among the network devices searched in step S600 according to the operation of the user. Then the processing proceeds to step S602.

In step S602, the scheduler module 303 sets a shutdown recommended time period via a setting screen (see FIG. 11) to the multifunctional device 120 selected in step S601. Then, the processing proceeds to step S603. The shutdown recommended time period according to the present exemplary embodiment is a time period the manager wants to keep the power supply of the multifunctional device shutdown, for example, time after office hours and holidays. The shutdown recommended time period includes start time and end time.

In step S603, the general control module 302 stores the name of the multifunctional device 120 that is the target of the power supply management selected in step S601, and the shutdown recommended time period set in step S603 in the database 311, and ends the processing.

Figure 7:
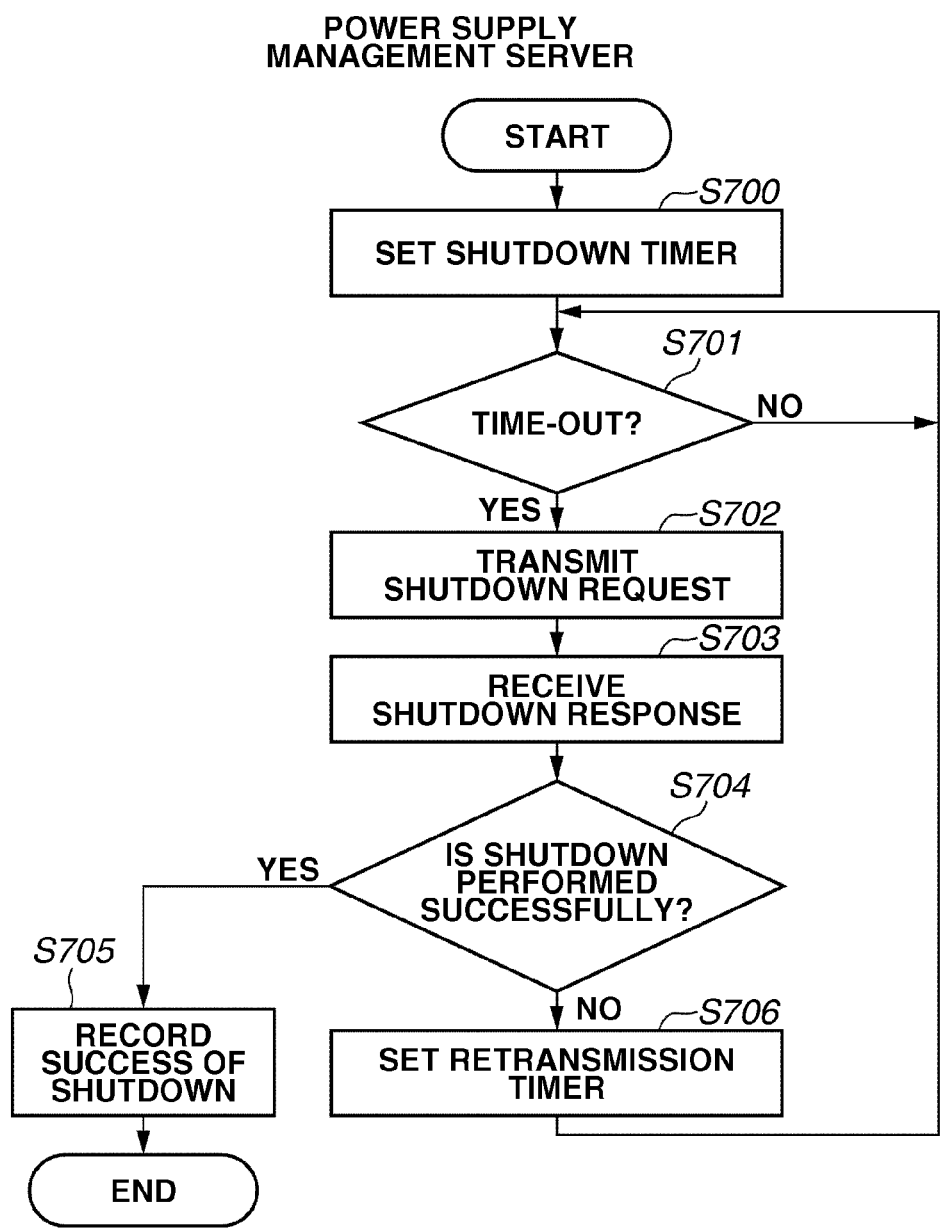
FIG. 7 is a flowchart illustrating power supply management processing in the power supply management server.

FIG. 7 is a flowchart illustrating operation in shutting down the power supply of the multifunctional device 120 by the network device management program. 300 running on the power supply management server 110. Hereinafter, a series of processing for shutting down the power supply of the multifunctional device by a command transmitted from the power supply management server 110 is referred to as "shutdown processing" or simply "shutdown".

In step S700, the scheduler module 303 sets a timer for the start time of the shutdown recommended time period stored in the database 311 in step S603 in FIG. 3, and the processing proceeds to step S701.

In step S701, the scheduler module 303 determines whether the timer indicating the start time of the shutdown recommended time set in step S700 times out. If it is determined that the time-out occurs (YES in step S701), the processing proceeds to step S702. If it is determined that the time-out has not occurred (NO in step S701), the processing in step S701 is subsequently performed.

In step S702, the power supply management module 309 transmits a command (shutdown request) for requesting shutdown to the multifunctional device 120 via the communication module 310 to the multifunctional device 120. Then the processing proceeds to step S703.

In this example, a response (shutdown response) to the shutdown request transmitted in step S702 is transmitted from the multifunctional device 120. In step S703, the power supply management module 309 receives the shutdown response via the communication module 310. Then, the processing proceeds to step S704.

In step S704, the power supply management module 309 analyzes the shutdown response received in step S703. As a result of the analysis in step S704, if the power supply management module 309 determines that the shutdown is normally performed by the multifunctional device 120 (YES in step S704), the processing proceeds to step S705. If the power supply management module 309 determines that the shutdown is not normally performed (NO in step S704), the processing proceeds to step S706.

If the multifunctional device 120 cannot normally perform the shutdown due to print processing being performed, receiving facsimile information, or the like, the multifunctional device 120 returns a shutdown response indicating that "the shutdown processing has not been normally performed (failure)" to the shutdown request.

In step S705, the power supply management module 309 registers history information indicating that "the shutdown processing has been successfully performed" in the database 311. Then, the processing ends. In step S706, the power supply management module 309 registers the history information indicating that "the shutdown processing has been failed" and sets a timer for resending the shutdown request. Then, the processing in step S701 is performed.

The timer value for resending the shutdown request is registered in the network device management program in advance.

Figure 8:
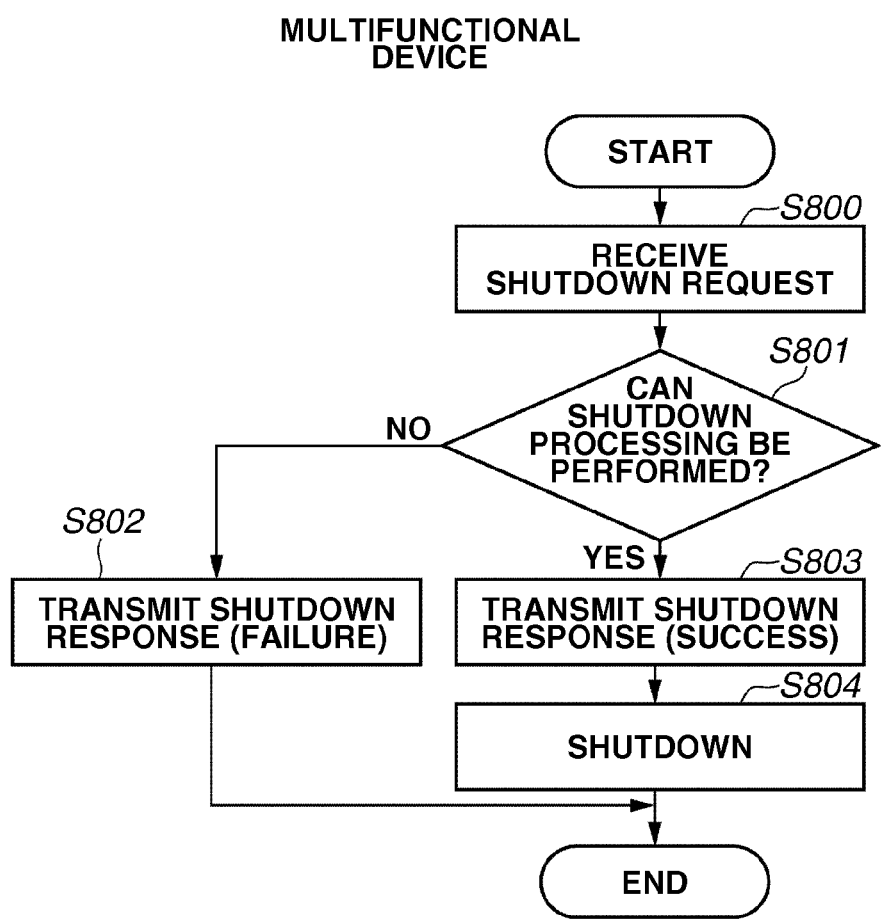
FIG. 8 is a flowchart illustrating power supply management processing in the multifunctional device.

FIG. 8 is a flowchart illustrating operation of the shutdown processing performed by the multifunctional device 120 in the power supply management system. A main entity of the operation in the flowchart is the application 506 that is stored in the memory unit 405 in the multifunctional device 120 and executed by the core control unit 400.

In step S800, the application 506 receives the shutdown request transmitted from the network device management program 300 running on the power supply management server 110 in step S702 in FIG. 7. Then, the processing proceeds to step S801.

In step S801, in order to respond to the shutdown request received in step S800, the application 506 determines whether the multifunctional device 120 can perform the shutdown processing.

If the application 506 determines that the multifunctional device 120 cannot perform the shutdown processing (NO in step S801), the application 506 performs processing in step S802. If the application 506 determines that the multifunctional device 120 can perform the shutdown processing (YES in step S801), the application 506 performs processing in step S803. The multifunctional device 120 according to the present exemplary embodiment cannot perform the shutdown processing when print processing is being performed, facsimile information is being received, and the like.

In step S802, the application 506 transmits a shutdown response indicating failure of the shutdown processing to the power supply management server 110, and ends the processing. In step S803, the application 506 transmits a shutdown response indicating success of the shutdown processing to the power supply management server 110. Then, the processing proceeds to step S804.

In step S804, the application 506 performs the shutdown processing including shutdown, and ends the processing. Hereinafter, the processing performed by the power supply management server 110 illustrated in FIG. 7 and the processing performed by the multifunctional device 120 illustrated in FIG. 8 is referred to as "shutdown reservation processing".

Figure 9:
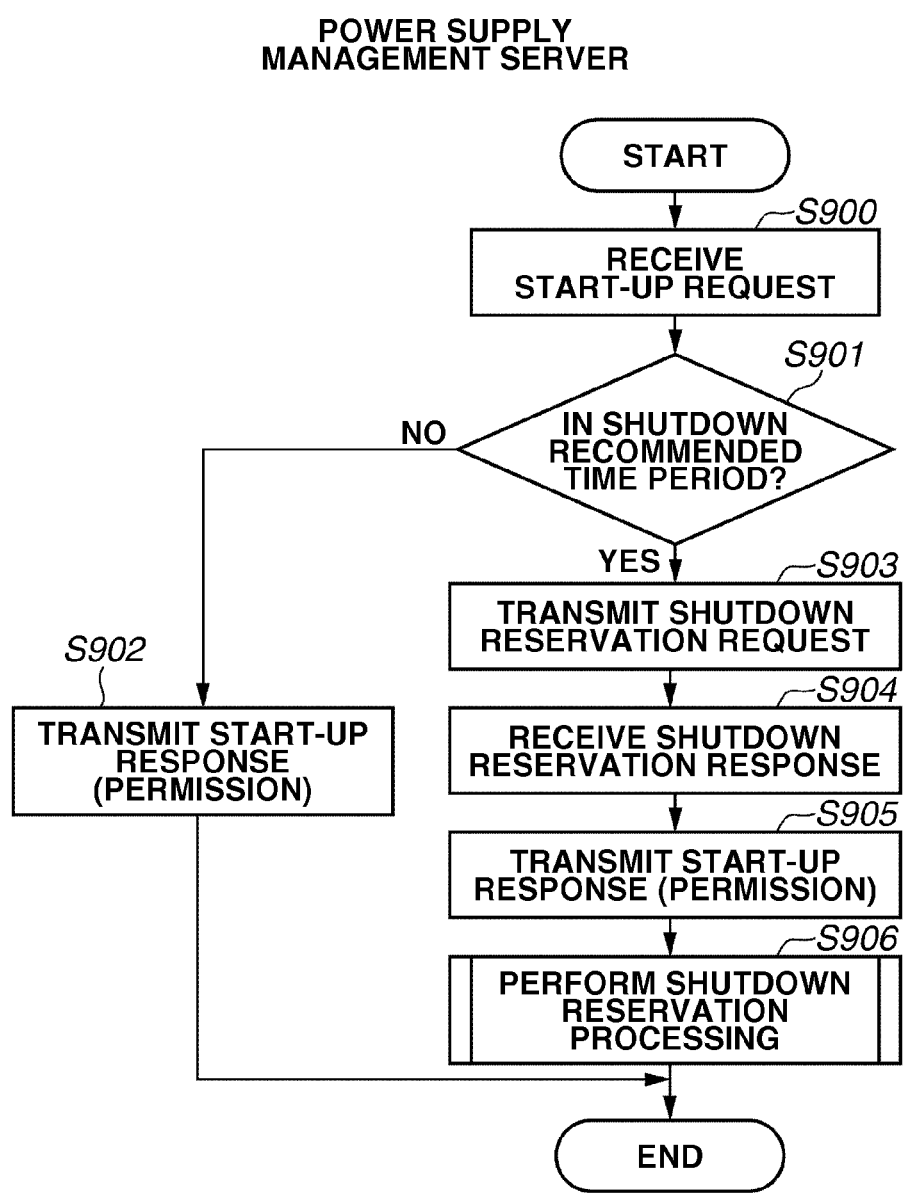
FIG. 9 is a flowchart illustrating power-off processing in the power supply management server.

FIG. 9 is a flowchart illustrating operation of the power supply management server 110 when the multifunctional device 120 is restarted by operation of the user after the shutdown reservation processing is performed.

In step S900, the network device management program 300 receives a command (start-up request) indicating start-up of the multifunctional device 120 is instructed by operation of the user from the multifunctional device 120. Then, the processing proceeds to step S901.

In step S901, the scheduler module 303 reads out the shutdown recommended time period of the multifunctional device 120 stored in the database 311, and compares current time to the shutdown recommended time period. If it is determined that the current time is out of the shutdown recommended time period (NO in step S901), the processing proceeds to step S902. If it is determined that the current time is within the shutdown recommended time period (YES in step S901), the processing proceeds to step S903.

In step S902, the power supply management module 309 transmits a response (start-up response (permission)) for permitting turning on the power supply in response to the start-up request received in step S900, to the multifunctional device 120 via the communication module 310, and ends the processing.

In step S903, to the start-up request received in step S900, the power supply management module 309 transmits a response (shutdown reservation request) for requesting reservation of execution of the shutdown processing to the multifunctional device 120 via the communication module 310.

In step S904, the power supply management module 309, via the communication module 310, receives the response (shutdown reservation response) from the multifunctional device 120 in response to the shutdown reservation request transmitted in step S903. Then, the processing proceeds to step S905. The shutdown reservation response received in step S904 includes setting (specification) of time (shutdown reservation time) the power supply of the multifunctional device 120 is shut down according to a procedure described below.

In step S905, the power supply management module 309 transmits a command (start-up response (permission)) for permitting start-up to the multifunctional device 120 via the communication module 310. Then the processing proceeds to step S906. The power supply management module 309 that performs the processing in steps S903 to S905 is an example of a start-up permission unit.

In step S906, the shutdown processing in the flowchart in FIG. 7 is performed, and then the processing ends.

In addition, in step S700, the scheduler module 303 sets the timer for the shutdown reservation time acquired in step S904. Then, the processing proceeds to step S701. In step S701, the scheduler module 303 determines whether the timer indicating the set shutdown recommended time has timed out.

If it is determined that the time-out occurs (YES in step S701), the processing after step S702 is performed. If it is determined that the time-out has not occurred (NO in step S701), the processing in step S701 is performed. As described above, the power supply management server 110 performs the management (power supply OFF management) for shutting down the power supply of the multifunctional device.

Figure 10:
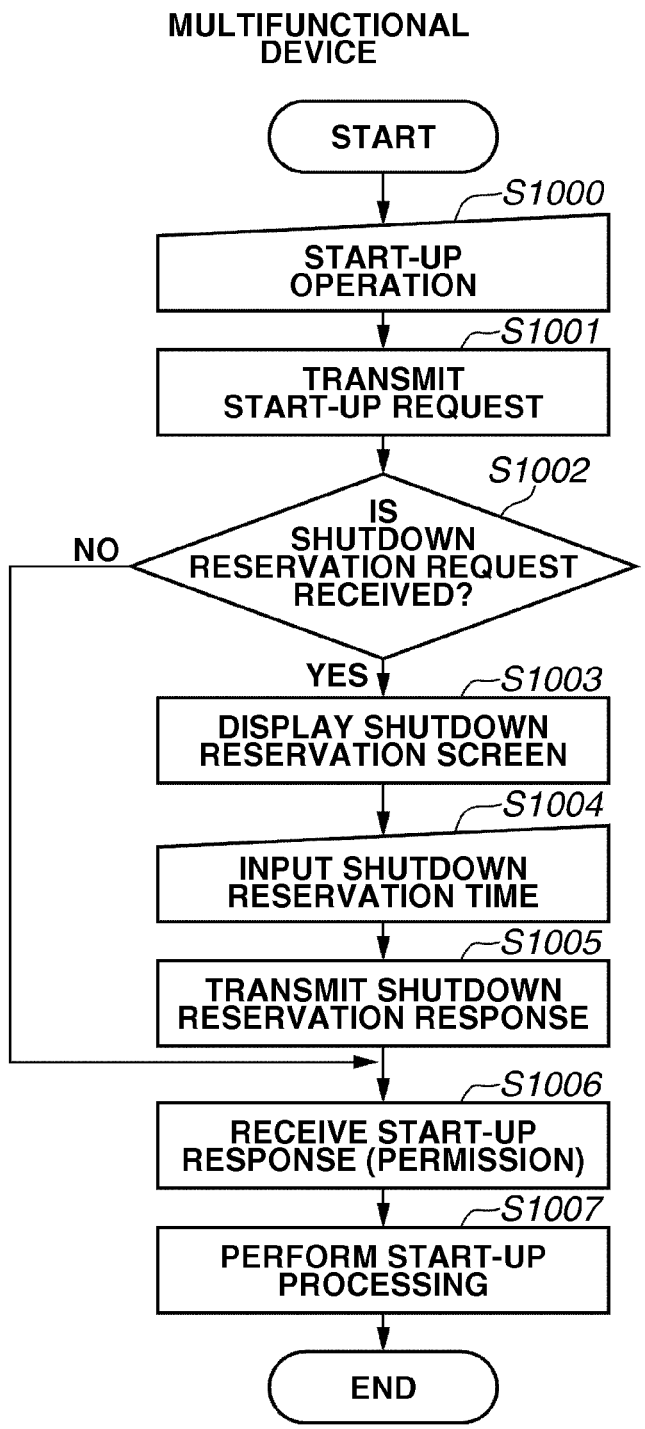
FIG. 10 is a flowchart illustrating power-off processing in the multifunctional device.

FIG. 10 is a flowchart illustrating operation of the application 506 running on the multifunctional device 120 when the multifunctional device 120 is started by the operation of the user in the power supply management system.

In step S1000, the application 506 receives the operation of start-up of the multifunctional device 120 from the operation unit 403 by the user. Then, the processing proceeds to step S1001. At the time the operation of the start-up is performed in step S1000, only the core control unit 400, the network interface unit 401, the operation unit 403, and the memory unit 405 in the multifunctional device 120 are started.

By a part of the functions (communication functions) started in step S1000, communication between the multifunctional device 120 and the power supply management server 110 such as sending and receiving of requests or responses is performed. Other than the communication function includes functions of a copying machine, a scanner, a printer, a facsimile, and the like are provided.

That is, the other hardware, for example, the document transmission unit 402, the formatter unit 404, the scanner unit 406, and the printer unit 407, which are devices used for information processing, are not started.

In step S1001, in response to the start-up operation in step S1000, the application 506 transmits a start-up request to the power supply management server 110. In step S1002, as a response to the start-up request transmitted in step S1001, the application 506 determines whether a shutdown reservation request is received.

If the application 506 determines that the shutdown reservation request is received (YES in step S1002), the processing proceeds to step S1003. If the application 506 determines that the shutdown reservation request is not received (NO in step S1002), the processing proceeds to step S1006. In step S1003, the application 506 displays a screen (see FIG. 12) for reserving shutdown on the operation unit 403. Then, the processing proceeds to step S1004.

In step S1004, the application 506 receives an input of reservation time from the user on the screen for reserving shutdown displayed on the operation unit 403. Then, the processing proceeds to step S1005.

In step S1005, the application 506 transmits a shutdown reservation response including information of the reservation time of shutdown input via the operation unit 403 to the power supply management server 110. In step S1006, the application 506 receives a start-up response (permission), which is a command for permitting the start-up, transmitted from the power supply management server 110. Then, the processing proceeds to step S1007.

In step S1007, the application 506 starts all hardware in the multifunctional device 120 in response to the start-up response (permission) received in step S1006. In the processing, hardware that has not started, for example, engine units in the formatter unit 404 and the printer unit 407 are started.

Figure 11:
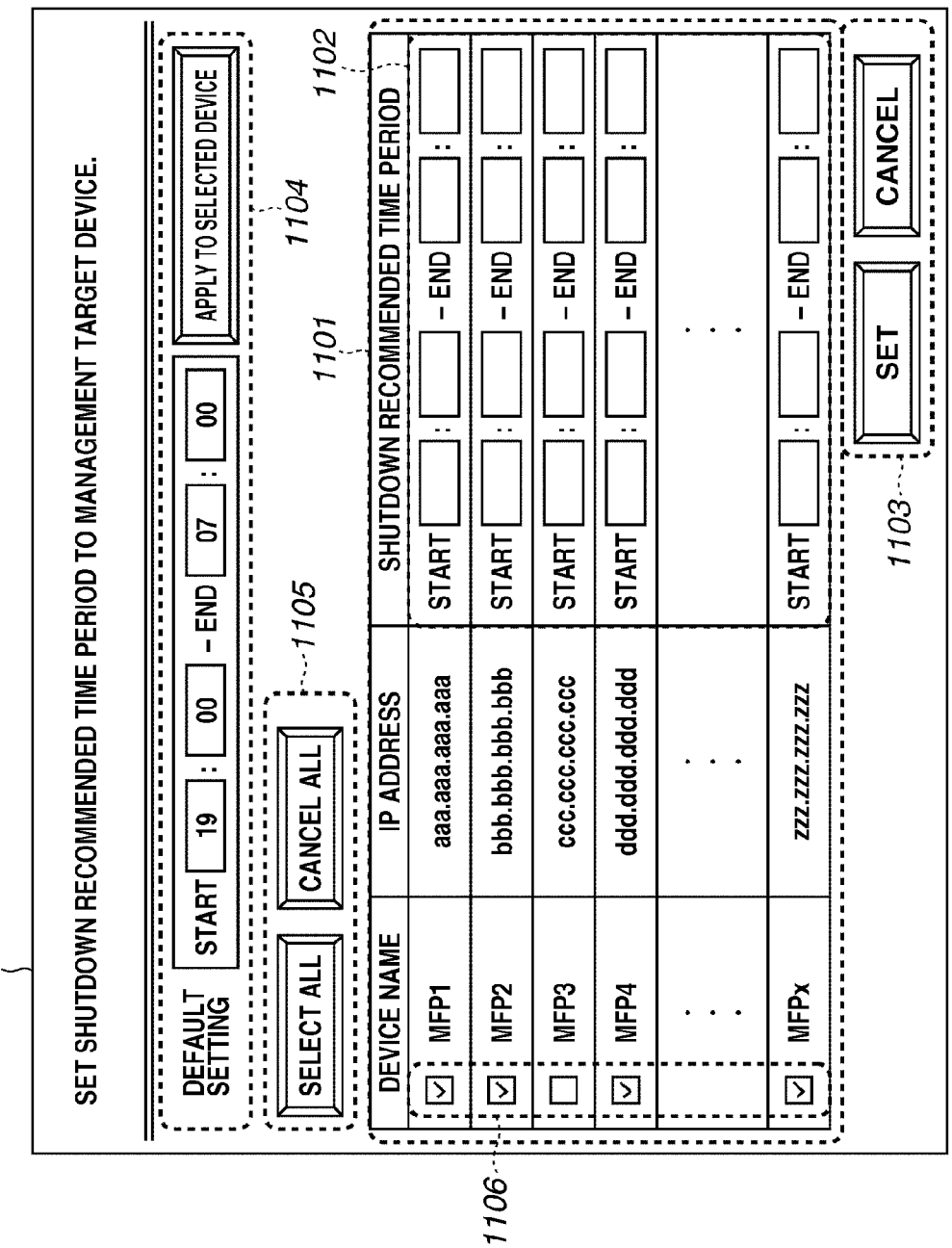
FIG. 11 illustrates an example of a screen on the power supply management server.

FIG. 11 illustrates an example of a screen displayed on the DISP 209 by the network device management program 300 running on the power supply management server 110 in the power supply management system. A screen 1100 is for setting the shutdown recommended time period displayed in the processing in step S602 in FIG. 6.

A device list 1101 lists the multifunctional devices searched in step S600 and selected in the processing in step S601 in FIG. 6. The device list 1101 includes device names that are user friendly names that can be set in the multifunctional devices, IP addresses, and input control of the shutdown recommended time periods. The display items are not limited to these items.

The control 1102 is for inputting the shutdown recommended time periods. The control 1102 includes text boxes for inputting start time and end time. Buttons 1103 are for storing (setting) or discarding (cancelling) setting values of the shutdown recommended time period set to the control 1102.

A control 1104 is for inputting default values of a shutdown recommended time period, and for applying the default values to a device selected by a check box 1106. Buttons 1105 are for uniformly setting the check box 1106 to a check state (select all) or an uncheck state (cancel all).

Figure 12:
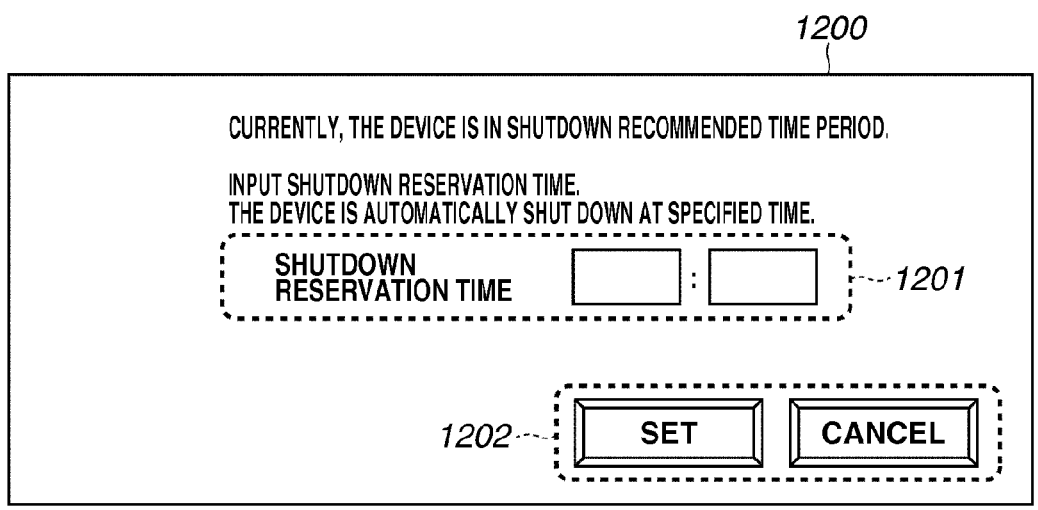
FIG. 12 illustrates an example of a screen on the multifunctional device.

FIG. 12 illustrates an example of a screen displayed on the operation unit 403 by the application 506 running on the multifunctional device 120 in the power supply management system. A shutdown reservation screen 1200 is for setting the shutdown reservation time displayed in step S1003 illustrated in FIG. 10. A control 1201 is for inputting shutdown reservation time by the user in step S1004 illustrated in FIG. 10.

Buttons 1202 are for storing (setting) or discarding (cancelling) shutdown reservation time set to the control 1201. Although not illustrated in FIG. 10, if the cancel button 1202 is pressed on the screen, the multifunctional device 120 is shut down.

As described above, in the power supply management system, first, a time period a shutdown state of a multifunctional device is to be maintained is set by a manager as a shutdown recommended time period. Then, by a user, within the shutdown recommended time period, for example, if the multifunctional device 120 is started, in response to a request of the network device management program 300, the shutdown reservation screen is displayed on the operation unit 403 in the multifunctional device 120

Then, the shutdown reservation time input by the user from the shutdown reservation screen displayed on the multifunctional device 120 is notified to the network device management program 300. The network device management program 300 transmits a shutdown request to the multifunctional device 120 at the notified shutdown reservation time, and shuts down the multifunctional device 120.

With the above-described configuration, within the time the shutdown state is to be maintained, it is possible to prevent the multifunctional device 120 that is started by the user from being left in the activated state as much as possible. Accordingly, unnecessary power consumption can be effectively prevented.

A second exemplary embodiment of the present invention is described. A system configuration, a hardware configuration, and a software configuration (or a module configuration) of a power supply management system according to the second exemplary embodiment are basically similar to those in the first exemplary embodiment. Configurations different from those in the first exemplary embodiment will be described if necessary.

Figure 13:
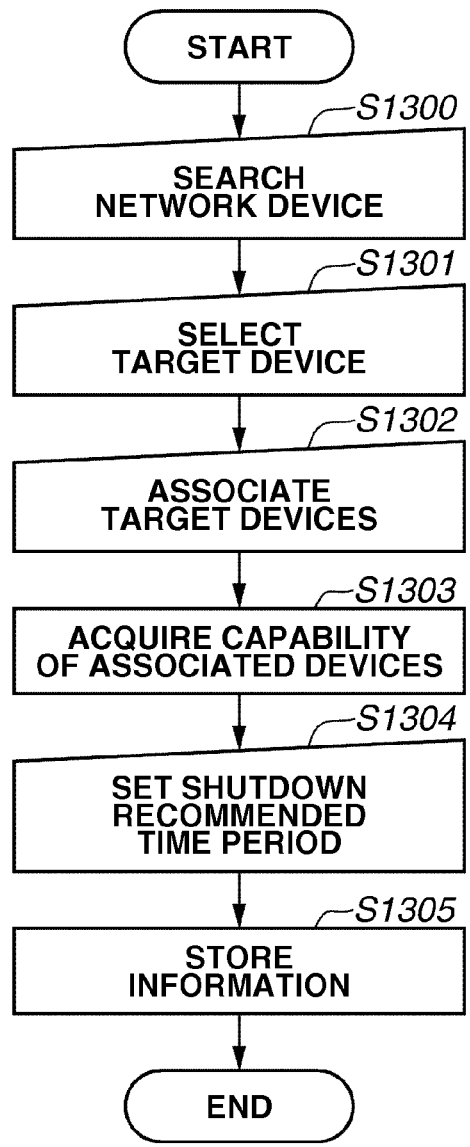
FIG. 13 is a flowchart illustrating data setting in the power supply management server.

FIG. 13 is a flowchart illustrating operation in acquiring and setting information for performing power supply management of the multifunctional devices 120, 121, and 122 by the network device management program 300 running on the power supply management server 110 according to the present exemplary embodiment.

In step S1300, the device search module 307 performs search processing of network devices on a condition set by the user in advance. In step S1301, the power supply management module 309 selects a multifunctional device to be the target of the power supply management from the searched network devices. Then, the processing proceeds to step S1302.

In step S1302, the device management module 304 associates the multifunctional devices selected in step S1301 with each other. Then, the processing proceeds to step S1303. The association in step S1302 is, for example, operation for performing grouping by using setup locations of the multifunctional devices as a key.

In step S1303, the device management module 304 acquires capability of the multifunctional devices selected in step S1301, and manages the multifunctional devices by the association group unit in step S1302. Then, the processing proceeds to step S1304. The acquisition of the capability in step S1303 is performed by the device management module 304, for example, using means such as SNMP.

In step S1304, the scheduler module 303 sets a shutdown recommended time period to each of the multifunctional devices selected in step S1301. Then, the processing proceeds to step S1305. In step S1305, the general control module 302 stores the names of the multifunctional devices selected in step S1301, information of the association performed in step S1302, and the shutdown recommended time period set in step S603 in the database 311, and ends the processing.

FIG. 14 is a flowchart illustrating operation of the network device management program 300 running on the power supply management server 110 when the power supply of the multifunctional device 120 is turned on by the operation of the user in the power supply management system. FIG. 14 illustrates operation performed when the multifunctional device 120 that is shut down after the shutdown reservation processing illustrated in FIGS. 7 and 8 is started by the operation of the user.

In step S1400, the network device management program 300 receives a command (start-up request) indicating power supply operation of the multifunctional device 120 is performed by the user. Then, the processing proceeds to step S1401.

In step S1401, the scheduler module 303 reads out the shutdown recommended time period of the multifunctional device 120 stored in the database 311, and compares current time and the shutdown recommended time period. If it is determined that the current time is out of the shutdown recommended time period (NO in step S1401), the processing proceeds to step S1402. If it is determined that the current time is within the shutdown recommended time period (YES in step S1401), the processing proceeds to step S1403.

In step S1402, the power supply management module 309 transmits a response (start-up response (permission)) for permitting turning on the power supply in response to the start-up request received in step S1400 to the multifunctional device 120 via the communication module 310, and ends the processing.

In step S1403, the device management module 304 performs processing of acquiring information of the status of the multifunctional devices associated with the multifunctional device 120 in the association in step S1302 in FIG. 13. Then, the processing proceeds to step S1404.

In step S1404, the device management module 304 refers to the associated multifunctional device status information acquired in step S1403, and detects a multifunctional device that is activated. As a result of the detection in step S1404, if there is a multifunctional device that is activated (YES in step S1404), the processing proceeds to step S1405. If there is no multifunctional device that is activated (NO in step S1404), the processing proceeds to step S1412.

In step S1405, the power supply management module 309 compares the capability of the multifunctional device 120 and that of the activated multifunctional device (in the example, the multifunctional device 121) detected in step S1404. Then, the processing proceeds to step S1406.

The comparison of the capability in step S1405 includes, for example, whether capability of color printing, two-sided printing, and stapling are included, or comparison of optional mounting state of a paper feeding/discharging unit is performed.

In step S1406, as a result of the comparison of the capability in step S1405, the power supply management module 309 determines which capability of the multifunctional device 120 and the multifunctional device 121 is higher. As a result of the determination in step S1406, if it is determined that the capability of the multifunctional device 120 is higher (YES in step S1406), the power supply management module 309 performs processing in step S1407. If it is determined that the capability of the multifunctional device 120 is lower or the multifunctional device 120 has similar functions (NO in step S1406), the processing proceeds to step S1410.

In the comparison of the capability of the devices, differences of the functions such as processable sheet size, color printing, post-processing such as bookbinding, and facsimile, are determined. For example, a device A that is activated has a scanner function and a monochromatic print function, and a device B that has already been activated has the function of the scanner function and a color/monochromatic print function. In such a case, it is determined that the device B has a higher capability.

In step S1407, the power supply management module 309 transmits a request (device selection request) for selecting which of the multifunctional device 120 and the multifunctional device 121 is to be used to the multifunctional device 120 via the communication module 310. Then, the power supply management module 309 performs processing in step S1408.

In step S1408, the power supply management module 309 receives a response (device selection response) to the device selection request transmitted in step S1407 via the communication module 310. Then, the processing proceeds to step S1409. The device selection response received in step S1408 includes information of the multifunctional device to be used, and information of the shutdown reservation time input by the user when the user changes the shutdown reservation time.

In step S1409, the power supply management module 309 analyzes the device selection response received in step S1408, and determines that the selected device is the multifunctional device 120 or the multifunctional device 121. As a result of the determination in step S1409, if it is determined that the multifunctional device 120 is selected (YES in step S1409), the processing proceeds to step S1415. If it is determined that the multifunctional device 121 is selected (NO in step S1409), the processing proceeds to step S1416.

In step S1410, the power supply management module 309 transmits a request (recommended device usage request) for recommending the use of the multifunctional device 121 via the communication module 310 to the multifunctional device 120. Then the processing proceeds to step S1411.

In step S1411, the power supply management module 309, via the communication module 310, receives a response (recommended device usage response) to the recommended device usage request transmitted in step S1410. Then, the processing proceeds to step S1416.

The recommended device usage response received in step S1411 includes information of the multifunctional device to be used, and information of the shutdown reservation time input by the user when the user changes the shutdown reservation time.

In step S1412, the power supply management module 309 transmits a shutdown reservation request via the communication module 310 to the multifunctional device 120.

In step S1413, the power supply management module 309, via the communication module 310, receives a shutdown reservation response from the multifunctional device 120 to the shutdown reservation request transmitted in step S1412. Then, the processing proceeds to step S1414. In the shutdown reservation response received in step S1413, the shutdown reservation time of the multifunctional device 120 is set.

In step S1414, the power supply management module 309 transmits a command for permitting start-up to the multifunctional device 120 via the communication module 310 to the multifunctional device 120. Then the processing proceeds to step S1415. In step S1415, the shutdown processing illustrated in FIG. 7 is performed to the multifunctional device 120, and the processing ends.

In step S1416, the power supply management module 309 performs processing for prompting the multifunctional device 120 to shut down the multifunctional device 120. Then, the processing proceeds to step S1417.

In step S1417, the power supply management module 309 analyzes the device selection response received in step S1408 or the recommended device usage response received in step S1411. Then, the power supply management module 309 determines whether the shutdown reservation time of the multifunctional device 121 is updated.

As a result of the determination in step S1417, if it is determined that the shutdown reservation time is updated (YES in step S1417), the processing proceeds to step S1418. If it is determined that the shutdown reservation time is not updated (NO in step S1417), the processing ends. In step S1418, the shutdown processing illustrated in FIG. 7 is performed to the multifunctional device 121, and then the processing ends.

FIG. 15 is a flowchart illustrating operation of the application 506 running on the multifunctional device when the power supply of the multifunctional device 120 is turned on by the operation of the user in the power supply management system.

In step S1500, the application 506 receives the operation of turning on the power supply of the multifunctional device 120 by the user via the operation unit 403. Then, the processing proceeds to step S1501. In the operation of the turning-on the power supply in step S1500, only the core control unit 400, the network interface unit 401, the operation unit 403, and the memory unit 405 in the multifunctional device 120 are started, and the other hardware is not activated.

In step S1501, the application 506 receives the operation of turning-on the power supply in step S1500, transmits a start-up request indicating that start-up operation is performed to the power supply management server 110. In step S1502, the application 506 receives a response to the start-up request transmitted in step S1501. Then, the processing proceeds to step S1503.

In step S1503, the application 506 determines whether the response to the start-up request received in step S1502 is a recommended device usage request. If the application 506 determines that the response to the start-up request is the recommended device usage request (YES in step S1503), the processing proceeds to step S1504. If the application 506 determines that the response to the start-up request is not the recommended device usage request (NO in step S1503), the processing proceeds to step S1508.

In step S1504, the application 506 displays information about the recommended device on a screen (see 1600*a* in FIG. 16) on the operation unit 403. Then, the processing proceeds to step S1505. On the recommended device information screen, information about the multifunctional device 121 included in the recommended device usage request transmitted in step S1410 in FIG. 14, and control for changing the shutdown reservation time of the multifunctional device 121, and the like are displayed.

In step S1505, the application 506 determines whether operation for changing the shutdown recommended time of the multifunctional device 121 is performed on the recommended device information screen displayed in step S1507. If the application 506 determines that the shutdown recommended time of the multifunctional device 121 is changed (YES in step S1505), the processing proceeds to step S1506. If the application 506 determines that the shutdown recommended time of the multifunctional device 121 is not changed (NO in step S1505), the processing proceeds to step S1507.

In step S1506, the application 506 sets the reservation time to the information of a recommended device usage response to be transmitted in step S1507. Then, the processing proceeds to step S1507. In step S1507, the application 506 transmits a response (recommended device usage response) to the recommended device usage request received in step S1502, and ends the processing.

In step S1508, the application 506 determines whether the response to the start-up request received in step S1502 is a device selection request. If the application 506 determines that the response to the start-up request is the device selection request (YES in step S1508), the processing proceeds to step S1509. If the application 506 determines that the response to the start-up request is not the device selection request (NO in step S1508), the processing proceeds to step S1514.

In step S1509, the application 506 displays information about the selection target multifunctional device on a screen (see 1600*b* in FIG. 16) on the operation unit 403. Then, the processing proceeds to step S1510.

On the device selection screen, information about the multifunctional device 121 included in the device selection request transmitted in step S1407 in FIG. 14, the control for changing the shutdown reservation time of the multifunctional device 121, and the like are displayed.

In step S1510, the application 506, on the device selection screen displayed in step S1509, determines which of the multifunctional device 120 and the multifunctional device 121 is selected. If the application 506 determines that the multifunctional device 121 is to be used (YES in step S1510), the processing proceeds to step S1511. If the application 506 determines that the multifunctional device 120 is to be used (NO in step S1510), the processing proceeds to step S1515.

In step S1511, the application 506 determines whether operation for changing the shutdown reservation time of the multifunctional device 121 is performed on the device selection screen displayed in step S1509. If the application 506 determines that the shutdown reservation time of the multifunctional device 121 is changed (YES in step S1511), the processing proceeds to step S1512. If the application 506 determines that the shutdown reservation time of the multifunctional device 121 is not changed (NO in step S1511), the processing proceeds to step S1513.

In step S1512, the application 506 sets the updated reservation time to the information of a device selection response to be transmitted in step S1513. Then, the processing proceeds to step S1513. In step S1513, the application 506 transmits the response (device selection response) to the device selection request received in step S1502, and ends the processing.

In step S1514, the application 506 determines whether the response received in step S1502 is a shutdown reservation request. If the application 506 determines that the shutdown reservation request is received (YES in step S1514), the processing proceeds to step S1515. If the application 506 determines that the shutdown reservation request is not received (NO in step S1514), the processing proceeds to step S1517.

In step S1515, the application 506 displays a shutdown reservation screen on the operation unit 403. If the user inputs shutdown reservation time from the shutdown reservation screen displayed on the operation unit 403 in the multifunctional device 120, the application 506 performs processing in step S1516.

In step S1516, the application 506 sets shutdown reservation time in a shutdown reservation response. Then, the processing proceeds to step S1517. In step S1517, the application 506 transmits the shutdown reservation response including the shutdown reservation time input from the shutdown reservation screen to the power supply management server 110, and ends the processing.

Although not illustrated in the flowchart, if the multifunctional device 120 is selected, after the above-described processing, start-up processing of the multifunctional device 120 is performed. If the multifunctional device 121 is selected, shutdown processing of the multifunctional device 120 is performed.

FIG. 16 illustrates an example of a screen displayed on the operation unit 403 by the application 506 running on the multifunctional device 120 in the power supply management system. The recommended device information screen 1600a is for displaying information of the recommended device displayed in step S1504 in FIG. 15.

A recommended device information part 1601a shows information about a recommended device. The information includes a device name that is a user-friendly name of a multifunctional device, a setup location, an IP address, and shutdown reservation time that is currently set.

An input control 1602a is for changing shutdown reservation time of a recommended device. A button control 1603a includes two types of selection of "YES" and "NO". If "YES" is selected, the shutdown reservation time set to the input control 1602a is stored. The selection is to be a trigger of the recommended device usage response to be transmitted in step S1507 in FIG. 15.

On the recommended device information screen 1600a, the use of the recommended device is enforced. Accordingly, on the screen 1600a, display is made such that the button of "NO" cannot be selected.

The device selection screen 1600b is for displaying information of the selection target device displayed in step S1509 in the flowchart in FIG. 15. The device selection part 1601b shows information about a selection target device. The information includes a device name that is a user-friendly name of the multifunctional device, a setup location, an IP address, and shutdown reservation time that is currently set.

An input control 1602b is for changing shutdown reservation time of a selection target device. A button control 1603b includes two types of selection of "YES" and "NO". If "YES" is selected, the shutdown reservation time set to the input control 1602b is stored. The selection is to be a trigger of the device selection response to be transmitted in step S1513 in FIG. 15. If "NO" is selected, the screen shifts to the shutdown reservation screen illustrated in FIG. 12.

As described above, in the power supply management system according to the present exemplary embodiment, first, as a shutdown recommended time period, a manager of the multifunctional device 120 sets time for maintaining a shutdown state of the multifunctional device to the network device management program 300. Then, the network device management program 300 associates a plurality of multifunctional devices to be managed with each other using conditions such as a setup location as a key.

In the processing, if a multifunctional device is started by a user within the set shutdown recommended time period, the network device management program 300 checks the status of the associated multifunctional devices.

As a result of the check, if there are activated multifunctional devices, the network device management program 300 compares capability of the devices. If there is a high-performance multifunctional device, the use of the high-performance device is enforced, and the recommended device information screen for setting shutdown reservation time is displayed.

In there is no high-performance multifunctional device in the activated multifunctional devices, the device selection screen for selecting a multifunctional device to be used and setting shutdown reservation time of the selected multifunctional device is displayed. The information and the shutdown reservation time of the multifunctional device selected on the device selection screen are notified to the network device management program 300.

The network device management program 300 transmits a shutdown request to the selected multifunctional device at the notified shutdown reservation time, and shuts down the multifunctional device.

If there is no activated multifunctional device in the associated multifunctional devices, operation similar to that in the first exemplary embodiment is performed.

With the above-described configuration, it is possible to prevent a plurality of devices from being activated at a time period while the shutdown states are to be maintained as much as possible, and more effective power supply management of the multifunctional devices can be performed.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-011395 filed Jan. 21, 2010, which is hereby incorporated by reference herein in its entirety.

What is claimed is:

1. A management apparatus configured to manage status of power supply of a plurality of image processing apparatuses capable of communicating via a network, the management apparatus comprising:
an association unit configured to associate the plurality of image processing apparatuses with each other;
a setting unit configured to set a time period for turning off the power supply of the image processing apparatuses;
a determination unit configured to determine whether current time is in the time period set by the setting unit if a start-up request is received from an image processing apparatus;
a request unit configured to transmit a reservation request for specifying time for turning off the power supply of the transmitted image processing apparatus that has transmitted the start-up request to the transmitted image processing apparatus if the determination unit determines that the current time is in the time period set by the setting unit;
a start-up permission unit configured to transmit a start-up response for permitting start-up of functions other than a communication function provided in the transmitted image processing apparatus when a reservation response, to the reservation request from the transmitted image processing apparatus, including specified time for turning off the power supply of the transmitted image processing apparatus is received to the transmitted image processing apparatus; and
a management unit configured to transmit a command for turning off the power supply of the transmitted image processing apparatus at the time specified by the reservation response, to the transmitted image processing apparatus,
wherein the request unit is configured to check status of the other image processing apparatuses associated with the transmitted image processing apparatus by the association unit and, in the other image processing apparatuses, if there is no activated image processing apparatus, transmit the reservation request to the transmitted image processing apparatus.

2. The management apparatus according to claim 1, wherein the request unit is configured to check status of the other image processing apparatuses associated with the transmitted image processing apparatus by the association unit and, in the other image processing apparatuses, if there is an activated image processing apparatus, transmit a usage request for urging the use of the activated image processing apparatus to the transmitted image processing apparatus.

3. The management apparatus according to claim 2, wherein the request unit is configured to check status of the other image processing apparatuses associated with the transmitted image processing apparatus by the association unit, in the other image processing apparatuses, if there is an activated image processing apparatus, compare capability of the transmitted image processing apparatus with capability of the activated image processing apparatus, and if the capability of the transmitted image processing apparatus is lower, transmit the usage request for prompting the use of the activated image processing apparatus to the transmitted image processing apparatus.

4. The management apparatus according to claim 2, wherein the request unit is configured to check status of the other image processing apparatuses associated with the transmitted image processing apparatus by the association unit, in the other image processing apparatuses, if there is an activated image processing apparatus, compare capability of the transmitted image processing apparatus with capability of the activated image processing apparatus, and if the capability of the transmitted image processing apparatus is higher, transmit a selection request for selecting which of the transmitted image processing apparatus and the activated image processing apparatus is to be used to the transmitted image processing apparatus.

5. The management apparatus according to claim 3, wherein the capability of the image processing apparatus includes at least one of a color print function, a post-processing function, and a facsimile function.

6. The management apparatus according to claim 2, wherein in the response to the request transmitted by the request unit, a time for turning off the power supply of the image processing apparatus to be used is specified, and
the management unit is configured to transmit a command for turning off the power supply of the image processing apparatus to be used at the time specified by the response to the image processing apparatus to be used.

7. A management method in a management apparatus configured to manage status of power supply of a plurality of image processing apparatuses capable of communicating via a network, the management method comprising:
associating the plurality of image processing apparatuses with each other;
setting a time period for turning off the power supply of the plurality of the image processing apparatuses;
determining whether current time is in the time period set by the setting if a start-up request is received from the image processing apparatus;
transmitting a reservation request for specifying time for turning off the power supply of the transmitted image processing apparatus to the transmitted image processing apparatus if it is determined that the current time is in the set time period;
transmitting a start-up response for permitting start-up of functions other than a communication function provided in the transmitted image processing apparatus when a reservation response, to the reservation request from the transmitted image processing apparatus, including specified time for turning off the power supply of the transmitted image processing apparatus is received to the transmitted image processing apparatus; and
transmitting a command for turning off the power supply of the transmitted image processing apparatus at the time specified by the reservation response to the transmitted image processing apparatus,
wherein the transmitting the reservation request is configured to check status of the other image processing apparatuses associated with the transmitted image processing apparatus and, in the other image processing apparatuses, if there is no activated image processing apparatus, transmit the reservation request to the transmitted image processing apparatus.

* * * * *